No. 828,480. PATENTED AUG. 14, 1906.
J. H. P. IBBOTT & W. R. YEARWOOD.
KEY.
APPLICATION FILED MAR. 1, 1905.
2 SHEETS—SHEET 1.
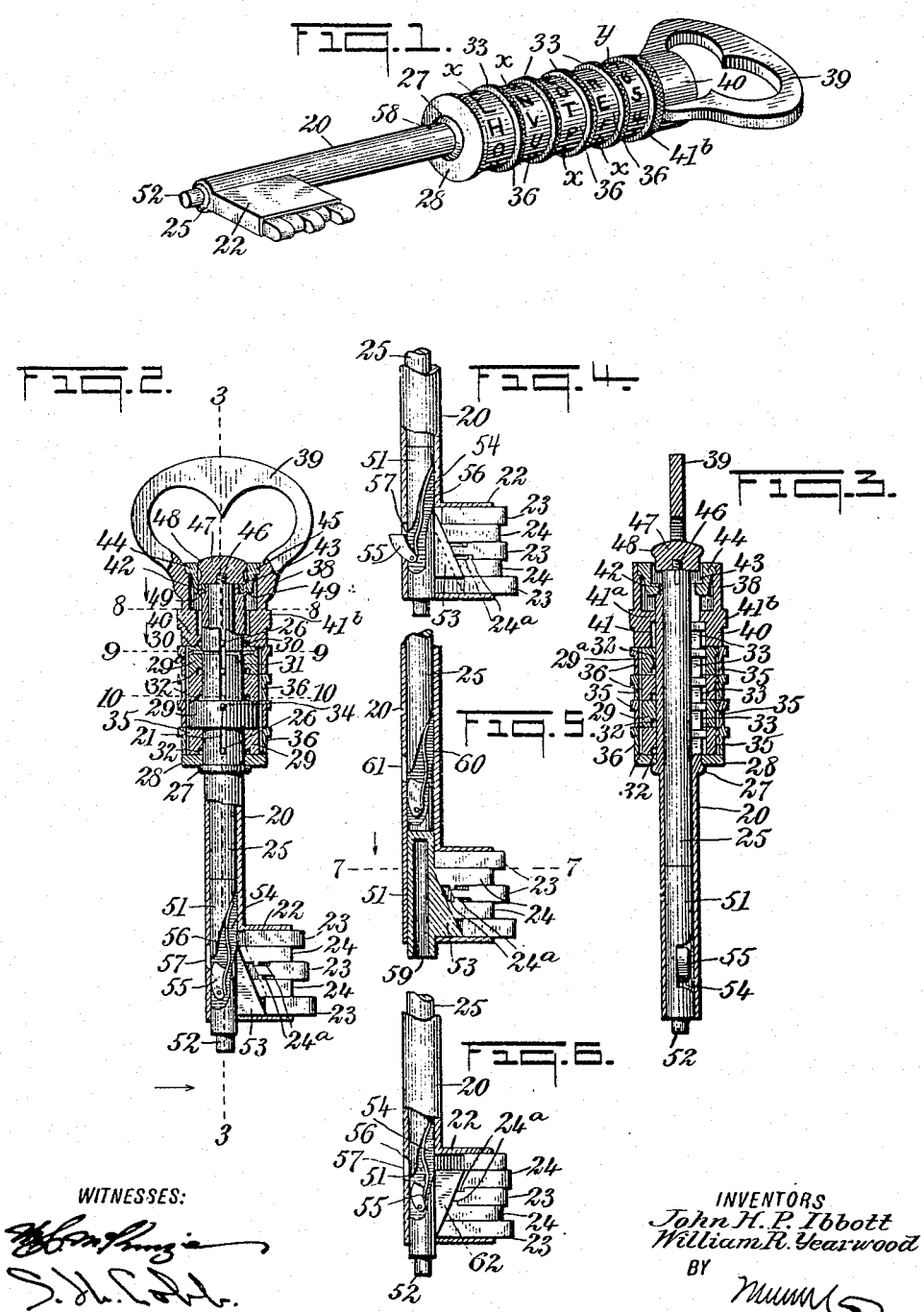
WITNESSES:
INVENTORS
John H. P. Ibbott
William R. Yearwood
BY
ATTORNEYS No. 828,480. PATENTED AUG. 14, 1906.
J. H. P. IBBOTT & W. R. YEARWOOD.
KEY.
APPLICATION FILED MAR. 1, 1905.
2 SHEETS—SHEET 2.
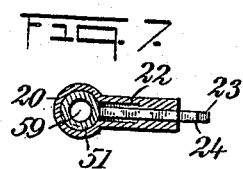
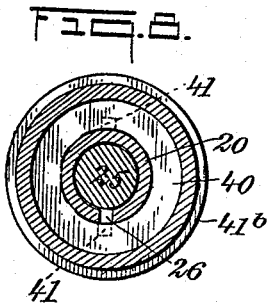
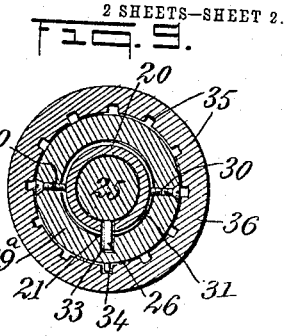
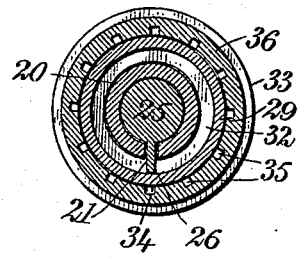
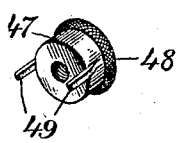
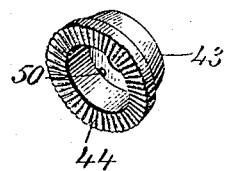
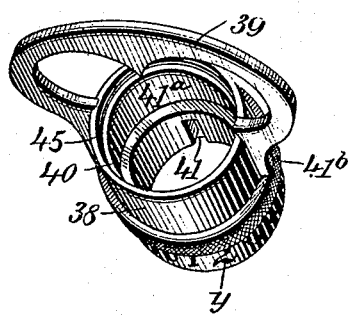
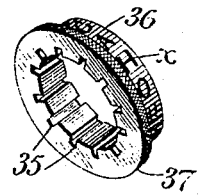
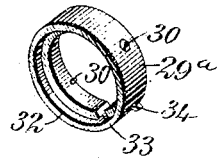
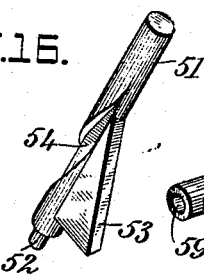
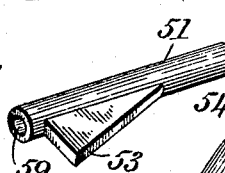
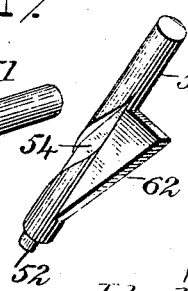
WITNESSES:
INVENTORS
John H. P. Ibbott
William R. Yearwood
BY
ATTORNEYS

UNITED STATES PATENT OFFICE.

JOHN HENRY PHILLIPS IBBOTT AND WILLIAM ROBERT YEARWOOD, OF NEW AMSTERDAM, BRITISH GUIANA.

KEY.

No. 828,480.  Specification of Letters Patent.  Patented Aug. 14, 1906.

Application filed March 1 1905. Serial No. 247,915.

*To all whom it may concern:*

Be it known that we, JOHN HENRY PHILLIPS IBBOTT and WILLIAM ROBERT YEARWOOD, subjects of the King of Great Britain, and residents of New Amsterdam, Berbice, British Guiana, have invented a new and Improved Key, of which the following is a full, clear, and exact description.

Our invention relates to keys for locks, and has for its principal objects the provision of such a device which is normally incapable of performing its function, but which may be readily manipulated or set by one familiar with its operation, so that it may be used in the customary manner.

It consists in the various features and combinations hereinafter described and more particularly claimed.

Reference is to be had to the accompanying drawings, forming a part of this specification, in which similar characters of reference indicate corresponding parts in all the views.

Figure 1 is a perspective view of one embodiment of our invention. Fig. 2 is an axial section therethrough, taken in the plane of the bits, one of the operating-collars being in elevation. Fig. 3 is a similar view taken in a plane at right angles or on the line 3 3 of Fig. 2. Fig. 4 shows the lower portion of the key illustrated in Fig. 2 with the elements in their acting position. Figs. 5 and 6 are similar views of other forms of our invention. Fig. 7 is a horizontal section on the line 7 7 of Fig. 5. Figs. 8, 9, and 10 are similar views on the lines 8 8, 9 9, and 10 10, respectively, of Fig. 2; and Figs. 11 to 18 are respectively perspective views of the rod-nut, the stem-nut, the finger-piece, one of the combination-collars, the outer locking-collar, and the stem extensions shown in Figs. 4, 5, and 6.

The key here illustrated comprises a stem 20, having extended longitudinally from one end a slot 21, while at one side of the opposite extremity projects a portion for engagement with a lock which in the present instance includes a casing 22, in which are mounted fixed bits 23 and intermediate movable bits 24. The central stationary bit 23 is provided with recesses in which operate the projections 24ª of the movable bits 24. The stem is preferably hollow or has a longitudinal bore in which is situated a rod or member 25, having a series of locking projections 26, which extend through the slot 21. These projections prevent the rotation of the rod within the stem, while permitting its endwise movement. Surrounding the stem at its central portion is an annular enlargement or stop-flange 27, with the side of which opposite the bits contacts a ring or washer 28. Fitting the stem and coacting with the washer is a series of operating-collars 29, which are shown as four in number, the last or outer of which (designated by the character 29ª) has two projections furnished by screws 30, the inner ends of which extend into a circumferential groove 31 in the stem. At the inner side of each collar is an annular groove 32, into which the corresponding locking projection normally extends, permitting the rotation of the collars about the stem. Each collar also has an internal lateral groove 33, opening from the groove 32, which grooves may receive the locking projections when the rod is moved longitudinally in the bore of the stem. Near the outer edge of each operating-collar is an external projection 34, which may enter one of a series of lateral grooves 35, of which twelve are shown, within combination-collars 36, surrounding the operating-collars. Each of the combination-collars is preferably provided with a knurled flange 37, by which it and its operating-collar may be conveniently rotated about the stem, and encircling the combination-collars at one side of their flanges are series of characters $x$, which may consist of letters and correspond to the grooves 35. Surrounding the end of the stem is an operating member or finger-piece 38, having the usual loop 39. A portion 40 of this finger-piece is of a diameter to fit the stem, and in this opening, through its inner end, are opposite recesses 41 41, which have at their outer ends walls 41ª. The finger-piece may have a knurled flange 41ᵇ, and at the inner side of this flange is shown a series of characters $y$, these in the present instance being numerals. Two of these are preferably opposite or in alinement with the recesses 41 and are used in setting the combination, while those between them are "dummies" or intended to mislead.

The stem is shown as provided at 42 with an external right-hand thread, with which coacts a nut 43, having a flange 44, scored or knurled upon its outer face and operating in a groove 45 in the finger-piece. This nut is recessed, and into its hollow portion projects the end of the rod 25, having a reduced portion, which is threaded left-handedly at 46 to receive a nut 47, normally lying within the recess of its companion nut. About its edge, within the nut 43 in the normal position of the elements, this nut 47 has a knurled or grip portion 48. From its inner side are projections 49, of which there may be two, so located that they may enter openings or depressions 50 in the inner portion or head of the hollow nut.

In the stem-bore adjacent to the bits is situated a member 51, which is virtually an extension of the rod 25, it being made separately therefrom for convenience in assembling the parts. At its inner end it contacts with said rod and at its outer extends beyond the stem and has a reduced portion or pin 52, which may be received by the usual socket in the lock. Projecting from the side of the extension is a contact portion 53, having an inclined face which diverges outwardly and operates within the bit-casing. In the extension is a recess 54, in which is pivoted a dog 55, forced normally outward by a spring 56, which may be of the leaf type and secured at one end to a wall of the recess. In the stem-wall is shown an opening 57, lying opposite the bits and through which the dog may project when the rod extension is in the proper position.

When the elements are in the position illustrated in Fig. 2 of the drawings, the locking projections of the rod extend into the annular recesses 32 in the operating-collars, permitting them, with the combination-collars and finger-piece, to be turned freely about the stem. When such a condition of affairs exists, upon the insertion of the key in the lock, which will receive its stem up to substantially the plane of the enlargement 27, it will be evident that it is ineffective to operate the lock-tumblers, since the finger-piece and bit portion have no operative connection with one another. At the same time the movable bits would be free to slide inwardly out of their correct position and would therefore not engage the lock-tumblers. The dog, it should be noted, is within the stem. If the combination-collars and finger-piece are turned about the stem to the correct combination or to a position in which a predetermined series of characters will be brought into alinement with an index-mark 58 upon the stem, the lateral grooves 33 in the operating-collars and one of the recesses 41 in the finger-piece will all be in alinement with one another. Now if the key is inserted in the lock the pin of the rod extension engaging the inner lock-plate will move said extension and rod longitudinally of the stem, the locking projections passing through the collar-grooves 33 and the contact-face of the member 53, pressing the movable bits into their operative position. As a result of this the combination-collars and finger-piece will be locked from rotary movement upon the stem, and the key may be rotated to bring the bits into coöperation with the lock-tumblers and move back the lock-bolt. The locking movement of the rod is preferably limited by the contact of its outer projection 26 with the end wall 41$^a$ of the finger-piece recess which it enters. Simultaneously the dog will have been forced by its spring through the stem-opening. This projection of the dog by its contact with the outer plate of the lock will prevent the thoughtless withdrawal of the key while the combination is so set. To release the key, it is necessary to press in the rod 25 by means of its nut, there being sufficient space between the lock-plates to allow the extension of the pin 52. This carries the dog into the stem, and upon taking out the key the releasing operation will have recalled to the mind of the user that the combination is to be thrown off by rotating the collars and finger-piece. It should be observed that until the correct combination has been set and the rod moved the key cannot be disassembled to give access to its interior mechanism, since the rod-nut must be first removed, and this is held against rotation by the engagement of its projections with those of the stem-nut, the threads being of opposite inclination; but when the combination is set and the rod moved to separate these projections and nut-openings the rod-nut may be unscrewed and then the stem-nut.

In Figs. 5 and 7 is shown a form of our improved key adapted for use with a key-post. In this case the rod extension 51 instead of having a pin to enter a lock-socket has a socket 59 to receive the key-post. As the mounting of the dog within the extension would interfere with the entrance of the post into the socket, it is shown as carried in a recess 60 in the end of the rod adjacent to the extension. In this case the stem-opening 61 is located considerably above the bits, and an additional retaining-plate must be provided upon the lock for the dog to coact with, since it will lie outside the usual lock-plate.

In Fig. 6 the contact member 62 instead of diverging outwardly from the rod extension and serving to force the bits into their proper position converges toward the outer end of the extension and upon operating movement provides a contact-surface into coaction with which the movable bits are pressed by their engagement with the lock-tumblers to assume their proper positions.

Having thus described our invention, we claim as new and desire to secure by Letters Patent—

1. A key comprising a stem, a portion carried by the stem for coöperation with the lock, an operating portion rotatable upon the stem, means for locking together the stem and operating portion, and means for retaining the key within the lock controlled by the locking means.

2. A key comprising a stem, a portion carried by the stem for coöperation with the lock, an operating portion rotatable upon the stem, combination mechansim for locking together the stem and operating portion, and means for retaining the key within the lock controlled by the combination mechanism.

3. A key comprising a stem, stationary and movable bits extending laterally from the stem, and means carried by the stem for controlling the position of the movable bits, said means being operated by the insertion of the key in the lock.

4. A key comprising a stem, stationary bits extending laterally from the stem, movable bits having guided movement between the stationary bits, and means for controlling the position of the movable bits.

5. A key comprising a stem, stationary and movable bits carried thereby, an operating portion rotatable upon the stem, and means for locking together the stem and operating portion and serving also to control the movement of the movable bits.

6. A key comprising a stem, stationary and movable bits carried thereby, an operating portion rotatable upon the stem, and combination mechanism for locking together the stem and operating portion and serving also to control the movement of the movable bits.

7. A key comprising a hollow and longitudinally-slotted stem, a portion carried by the stem for coöperation with the lock, an operating portion rotatable upon the stem, a member movable longitudinally within the stem while being held against rotation therein, a locking projection carried by the member and working in the slot of the stem, and a member rotatable about the stem and having a groove extending longitudinally of said stem and which may receive the locking projection.

8. A key comprising a hollow and longitudinally-slotted stem, a portion carried by the stem for coöperation with the lock, an operating portion rotatable upon the stem, a member movable longitudinally within the stem while being held against rotation, a series of locking projections carried by the member and projecting through the slot of the stem, and members rotatable about the stem, each of said members having a groove extending longitudinally of the stem and which may receive the locking projections.

9. A key comprising a hollow stem provided with a lateral opening, a portion carried by the stem for coöperation with the lock, an operating portion rotatable upon the stem, a member movable longitudinally within the stem while being held against rotation therein, a locking projection carried by the member, a dog pivoted upon said member and extensible through the stem-opening, and a member rotatable about the stem and having a groove extending longitudinally of said stem and which may receive the locking projection.

10. A key comprising a hollow stem, stationary bits extending laterally from the stem, movable bits between the stationary bits, and a member longitudinally movable in the stem and having means for engaging the movable bits to move them into operative position.

11. A key comprising a hollow stem, radially-movable bits carried thereby, an operating portion rotatable upon the stem, a member movable longitudinally within the stem and engaging the bits to move them into operative position, the stem being held against rotation, a projection carried by the member, and a member rotatable about the stem and having a groove extending longitudinally of said stem and which may receive the projection.

12. A key comprising a hollow stem having a slot, a rod situated within the stem and provided with a projection extending through the slot, an operating-collar having a groove to receive the projection, and a collar surrounding the operating-collar and operatively connected therewith, said collar being provided with a series of characters.

13. A key comprising a hollow stem having a slot, a rod situated within the stem and provided with a projection extending through the slot, an operating-collar having a groove to receive the projection, a collar provided with a series of characters and surrounding the operating-collar, and means for fixing the character-collar against rotation upon the operating-collar.

14. A key comprising a hollow stem having a slot, a rod situated within the stem and provided with a projection extending through the slot, said stem and rod being threaded at one extremity, a collar having a groove to receive the projection, a nut engaging the stem-thread, and a coacting nut engaging the rod-thread.

15. A key comprising a hollow stem having a slot, a rod situated within the stem and provided with a projection extending through the slot, said stem and rod being threaded at one extremity, a collar having a groove to receive the projection, a nut having a recess and engaging the stem-thread, and a coacting nut engaging the rod-thread and being situated within the recess.

16. A key comprising a hollow stem having a slot, a rod situated within the stem and provided with a projection extending through the slot, said stem and rod being threaded at one extremity, a collar having a groove to receive the projection, a nut engaging the stem-thread, and a coacting nut engaging the rod-thread, one of said nuts having a projection engaging a depression in the other nut.

17. A key comprising a hollow stem having a slot, a rod situated within the stem and provided with a projection extending through the slot, said stem and rod being oppositely threaded at one extremity, a collar having a groove to receive the projection, a nut engaging the stem-thread, and a coacting nut engaging the rod-thread.

18. A key comprising a hollow stem having a slot, a rod situated within the stem and provided with a projection extending through the slot, said stem and rod being threaded at one extremity, a collar having a groove to receive the projection, a nut having a recess and depressions and engaging the stem-thread, and a coacting nut engaging the rod-thread and situated within the recess, the last-named nut having projections which may enter the depressions.

19. A key comprising a hollow stem, stationary bits extending laterally from the stem, movable bits having guided and limited movement between the stationary bits, and a rod movable in the stem and provided with means for engaging the movable bits to move them into operative position.

20. A key comprising a hollow stem, radially-movable bits carried thereby, a rod movable in the stem and provided with an inclined projection to engage the bits to move them into operative position, and means for operating the rod.

21. A key comprising a hollow stem carrying a casing, fixed and movable bits in the casing, the central fixed bit having recesses and the movable ones projections engaging the recesses of the said fixed bit, and a rod mounted to move endwise in the stem and provided with an inclined projection for engaging the movable bits to move them into operative position.

22. A key comprising a hollow stem, radially-movable bits carried by the stem, a movable member in the stem and having a portion projecting out of the stem for engaging a part of the lock to operate it when the key is inserted in the lock, and means for moving the bits into operative position by the movement of said member.

23. A key comprising a hollow stem, radially-movable bits carried by the stem, and a sectional rod movable endwise in the stem, the outer section of the rod projecting beyond the end of the stem for engaging a part of a lock to move it endwise and provided with means for engaging the bits to move them into operative position when the member is operated by inserting the key in the lock.

In testimony whereof we have signed our names to this specification in the presence of two subscribing witnesses.

JOHN HENRY PHILLIPS IBBOTT.
WILLIAM ROBERT YEARWOOD.

Witnesses:
RICHARD T. EGG,
W. AUSTIN.